United States Patent [19]
Matsumoto

[11] Patent Number: 5,543,987
[45] Date of Patent: Aug. 6, 1996

[54] HEAD CARRIAGE DEVICE HAVING APPLYING FORCE MEANS DISPOSED WITHIN PILLAR PORTION

[75] Inventor: Kenji Matsumoto, Hoya, Japan

[73] Assignee: Teac Corporation, Japan

[21] Appl. No.: 370,563

[22] Filed: Jan. 9, 1995

Related U.S. Application Data

[63] Continuation of Ser. No. 57,479, May 3, 1993, abandoned.

[30] Foreign Application Priority Data

May 27, 1992 [JP] Japan .................. 4-135261

[51] Int. Cl.⁶ .............................. G11B 5/54; G11B 21/16
[52] U.S. Cl. .......................................... 360/105; 360/104
[58] Field of Search .................................. 360/104, 105, 360/106; 369/215, 219, 222, 244

[56] References Cited

U.S. PATENT DOCUMENTS

| | | | |
|---|---|---|---|
| 4,433,352 | 2/1984 | De Marco et al. | 360/104 |
| 4,703,375 | 10/1987 | Chan et al. | 360/104 |
| 4,710,836 | 12/1987 | Hishi | 360/106 |
| 4,811,140 | 3/1989 | Enami et al. | 360/104 |
| 4,849,840 | 7/1989 | Fujioka | 360/104 |
| 4,980,787 | 12/1990 | Iwanaga | 360/104 |
| 5,023,735 | 6/1991 | Kuzuhara | 360/104 |
| 5,055,955 | 10/1991 | Mitsuhashi et al. | 360/104 |

FOREIGN PATENT DOCUMENTS

| | | |
|---|---|---|
| 59-94274 | 5/1984 | Japan . |
| 63-271778 | 11/1988 | Japan . |
| 1-317290 | 12/1989 | Japan . |
| 4-216366 | 8/1992 | Japan . |

OTHER PUBLICATIONS

Bowen et al, *Head Suspension System For Flexible Disk Files*, IBM Technical Disclosure Bulletin, vol. 24 No. 11B, Apr. 1982, pp. 6171–6172.

Primary Examiner—Stuart S. Levy
Assistant Examiner—William R. Korzuch
Attorney, Agent, or Firm—Ladas & Parry

[57] ABSTRACT

In a head carriage device, a carriage has a first head at a first end thereof. The carriage extends approximately in a disc radial direction, in which a recording-medium disc is loaded in an associated disc apparatus. The carriage has at least one pillar portion at a second end thereof. The pillar portion extends in a direction approximately perpendicular to the disc radial direction. A head arm has a second head at a first end thereof. Both the first head and the second head are used for jointly accessing both sides of the recording-medium disc. A supporting member has a mechanically flexible property. A first end thereof is fixed on a top of the pillar portion and a second end thereof is fixed on a pivotal supported portion of the head arm. The pivotal supported portion of the head arm is apart from a second end of the head arm. The supporting member flexibly supports the head arm so that the head arm extends approximately along the disc radial direction. The applying force means is provided within the pillar portion and between the second end of the carriage and the second end of the head arm. The applying force means applies a force on the respective second ends of the carriage and head arm in a direction that the applied force moves the head arm apart from the carriage.

16 Claims, 12 Drawing Sheets 5,543,987

1

HEAD CARRIAGE DEVICE HAVING APPLYING FORCE MEANS DISPOSED WITHIN PILLAR PORTION

This is a continuation of application Ser. No. 08/057,479 filed on May 3, 1993, now abandoned.

BACKGROUND OF THE INVENTION

The present invention relates to a head carriage device, and particularly relates to a head carriage device for use in loading a disc type recording medium (hereinafter, a disc type recording medium will be called a recording-medium disc) so that data can be written therein and read therefrom.

A first example of head carriage devices in related art will now be described with reference to FIG. 1. The head carriage device has a carriage 2, a lower magnetic head 5 fixed on an end of the carriage 2, a head arm 4, and an upper magnetic head 6 fixed on an end of the head arm 4. The head carriage device further has a leaf spring 7 and a torsion spring 9. In the first example, as shown in FIG. 1, the torsion spring 9 is supported by a supporting portion 2a which is protruded from the top of a pillar portion 8 provided at the other end of the carriage 2. The torsion spring 9 is located at a position higher than that of the head arm 4. The torsion spring 9 applies a downward force to the head arm 4, the direction of the applied force being such that the head arm 4 rotates in counter-clockwise direction.

However, in the head carriage device of FIG. 1, the torsion spring 9 for applying the downward (in FIG. 1) force to the head arm 4 is located on the top of the pillar portion 8. (The downward (in FIGS. 1, 2 and 3) force applied to the head arm 4 ensures that the magnetic heads 5 and 6 can access a magnetic disc to be inserted between the magnetic heads 5 and 6.) Thus, a magnetic disc apparatus which has the head carriage device of FIG. 1 therein needs a space to contain therein the torsion spring 9 on the top of the head carriage device of FIG. 1, the space having a height $L_1$. The space may interfere with a miniaturization of the magnetic disc apparatus.

A second example of head carriage devices in related art will now be described with reference to FIG. 2. In the head carriage device of FIG. 2, a torsion spring 10 is supported by a supporting portion 2b which is protruded from the top of the pillar portion 8. A downward force is applied to the head arm 4 by means of the torsion spring 10, the direction of the applied force being such that the head arm 4 rotates in a counter-clockwise direction (in FIG. 2) so that the right end (in FIG. 2) of the head arm 4 downward (in FIG. 2) presses the upper magnetic head 6.

However, in the head carriage device of FIG. 2, the torsion spring 10 for applying the downward (in FIG. 2) force to the head arm 4 is located on the right side (in FIG. 2) of the pillar portion 8. Thus, a magnetic disc apparatus which has the head carriage device of FIG. 2 therein needs a space to contain therein the torsion spring 10 on the right side of the head carriage device of FIG. 2, the space having a length $L_2$ thereof. The space may interfere with a miniaturization of the magnetic disc apparatus.

A third example of head carriage devices in the related art will now be described with reference to FIG. 3. In the head carriage device of FIG. 3, a tension spring (coil spring) 3 forces downward (in FIG. 3) a portion of the head arm 4, the portion of the head arm 4 being located near the leaf spring 7 supporting the head arm 4 therethrough. A downward force is applied to the head arm 4 by means of the tension spring

2

3, the direction of the applied force being such that the head arm 4 rotates in a counter-clockwise direction (in FIG. 3) so that the left end (in FIG. 3) of the head arm 4 downward (in FIG. 3) presses the upper magnetic head 6.

However, in the head carriage device of FIG. 3, the tension spring (coil spring) 3 for applying downward (in FIG. 3) force to the head arm 4 is located on the left side (in FIG. 3) of the pillar portion 8. Thus, a magnetic disc apparatus which has the head carriage device of FIG. 3 therein needs a space to contain therein the tension spring 3 on the left side of the pillar portion 8, the space having a length $L_3$ thereof. A containing disc case which contains a magnetic disc to be accessed by the magnetic heads 5 and 6 may be inserted between the head arm 4 and the carriage 2, and the magnetic heads 5 and 6 access the magnetic disc contained therein. To insert such a case between the head arm 4 and the carriage 2, a space corresponding to the construction of the disc containing case is needed between the head arm 4 and the carriage 2, the space having a size large enough to prevent the spring 3 from interfering the insertion of the disc containing case. As a result of the provision of such a space for the case, the pillar 8 has to be located further to the right side (in FIG. 3) to provide in turn a sufficient space (having the length $L_3$) for containing the spring 3, thus preventing the spring from interfering with the insertion of the case. However, such a locating of the pillar 8 further to the right (in FIG. 3) increases the overall size of the head carriage device, which may interfere with a miniaturization of the magnetic disc apparatus.

In summary, the above described problems of the head carriage devices in the related art prevent the magnetic disc apparatus to which one of the head carriage devices is applied from being miniaturized, such miniaturization including reduction of the thickness of the apparatus.

SUMMARY OF THE INVENTION

An object of the present invention is to provide a head carriage device which facilitates miniaturization of a disc apparatus to which the device is applied, such miniaturization including reduction of the thickness of the apparatus, thus providing a head carriage device having small overall dimensions.

To achieve the above object, a head carriage device according to the present invention is provided, which device comprises:

a carriage having a first head at a first end thereof, said carriage extending approximately in a disc radial direction, which direction is a radial direction in which a recording-medium disc is loaded in said head carriage device, and said carriage having a pillar portion at a second end thereof, said pillar portion extending in a direction approximately perpendicular to said disc radial direction;

a head arm having a second head at a first end thereof, both said first head and second head being used for jointly accessing both side of the recording-medium disc loaded in said head carriage device;

a supporting member having a mechanically flexible property, a first end thereof being fixed on a top of said pillar portion, and a second end thereof being fixed on a portion of said head arm, said portion of said head arm being apart from a second end of said head arm, said supporting member flexibly supporting said head arm so that said head arm extends approximately in said disc radial direction; and applying force means provided between said second end of said carriage and said second end of said head arm, to apply a force on said respective second ends of said carriage and head arm, a direction of said force being such as to move said head arm apart from said carriage.

By the above construction, even though the applying force means is provided between the second end of the carriage and the second end of the head arm, the second end of the carriage substantially supporting the head arm, the applying force means applies a force on the respective second ends of both the carriage and head arm, the force effecting the first end of the head arm so that the second head provided on the first end of the head arm presses the first head provided on the first end of the carriage.

Thus, a space required for containing the applying force means may be reduced so as to realize miniaturization of a disc apparatus to which the head carriage device is applied.

Other objects and further features of the present invention will become more apparent from the following detailed description when read in conjunction with the accompanying drawings.

DESCRIPTION OF THE PREFERRED EMBODIMENTS

Figure 1:
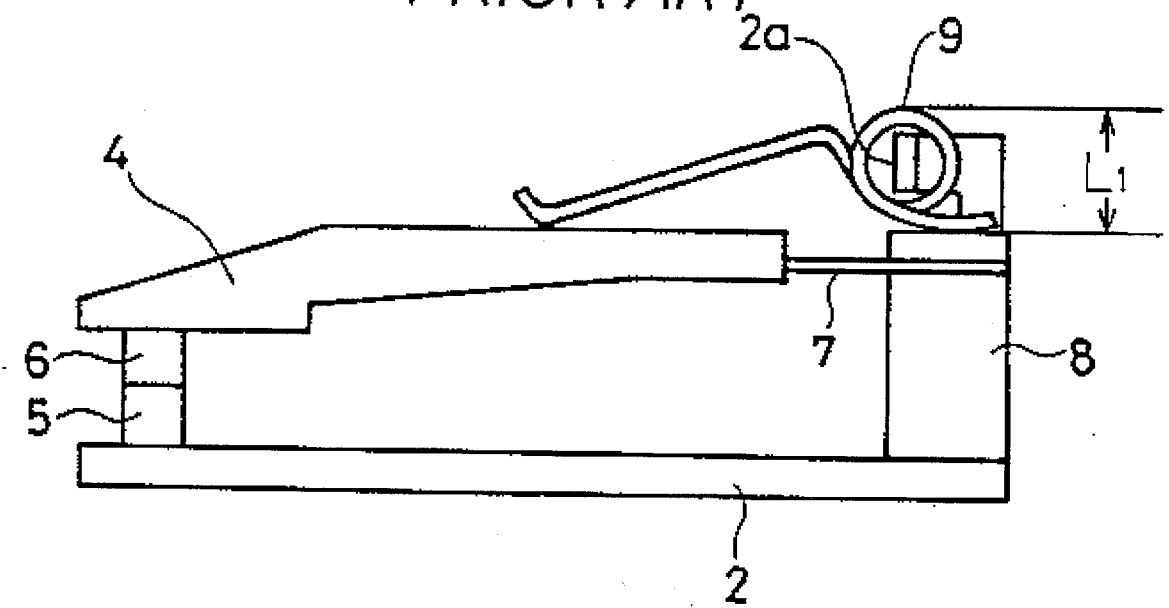
FIGS. 1, 2 and 3 illustrate basic constructions of head carriage devices in the related art.
Figure 2:
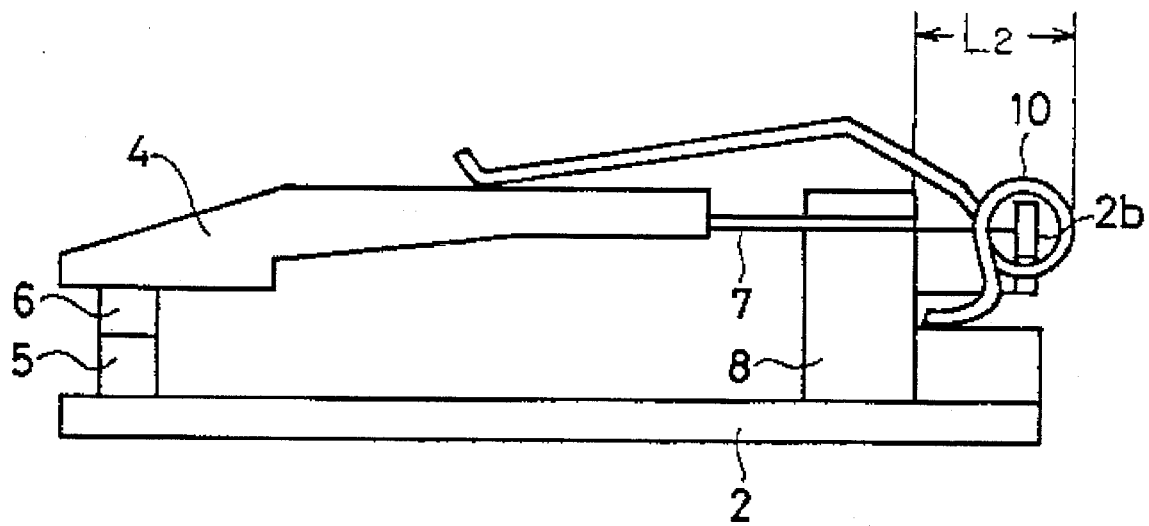
Figure 3:
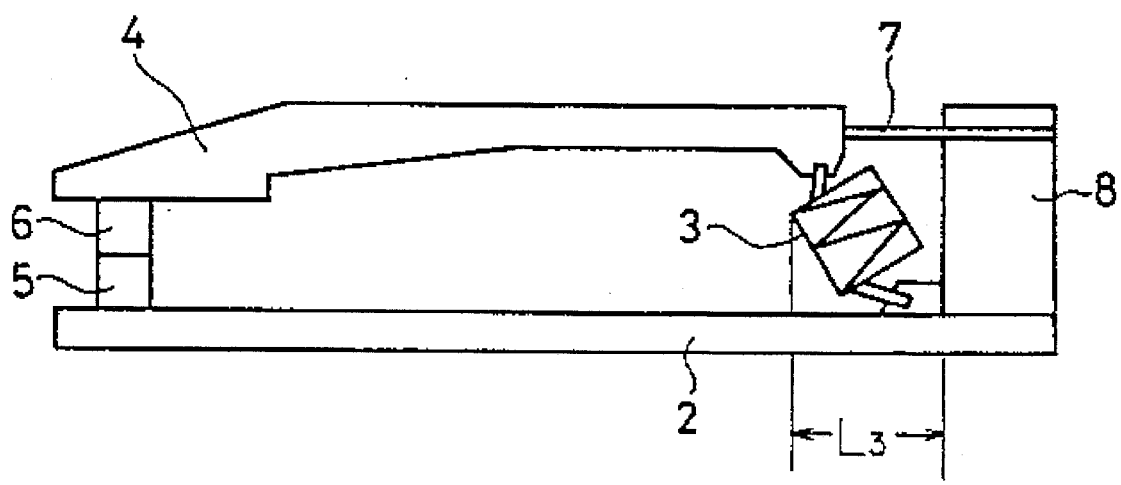
Figure 4B:
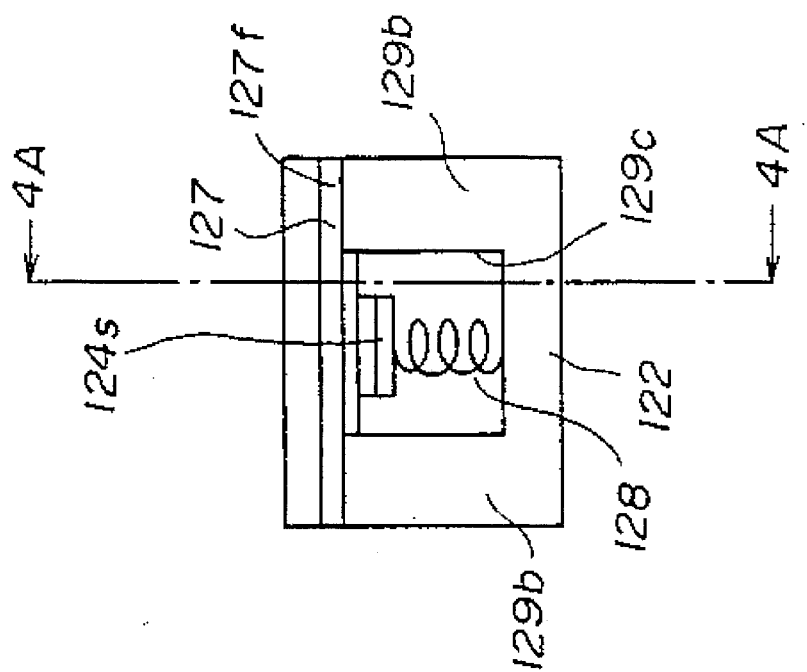
FIGS. 4A and 4B illustrate a basic construction of an embodiment of a head carriage device according to the present invention, FIG. 4A showing a sectional view taken along a line 4A—4A in FIG. 4B, and FIG. 4B showing a side view viewed from a direction 4B in FIG. 4A.
Figure 4A:
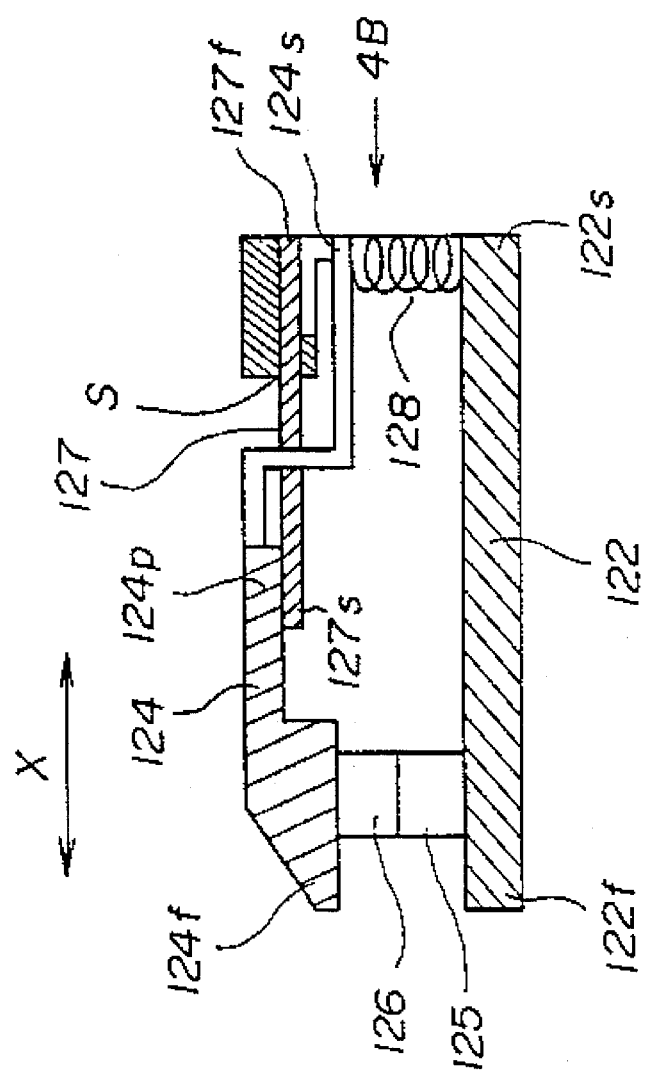

A head carriage device according to an embodiment of the present invention will now be described with reference to FIGS. 4A and 4B.

A head carriage device 21 comprises a carriage 122 having a first magnetic head 125 at a first end 122f thereof, the carriage 122 extending approximately in a disc radial direction X, which direction X is a radial direction in which a recoding-medium disc is loaded in the head carriage device, and the carriage 122 having pillar portions 129b and 129b at a second end 122s thereof, the pillar portions 129b and 129b extending in approximately perpendicular to the disc radial direction X.

The head carriage device further comprises a head arm 124 having a second magnetic head 126 at a first end 124f thereof, both the first magnetic head 125 and second magnetic head 126 being used for jointly accessing both sides of the recording-medium disc loaded in the head carriage device;

The head carriage device further comprises a supporting member 127 having a mechanically flexible property, a first end 127f thereof being fixed on a top of the pillar portions 129b and 129b, and a second end 127s thereof being fixed on the head arm 124 at a portion 124p of the head arm, the portion 124p of the head arm 124 being apart from the second end 124s of the head arm 124, the supporting member 127 flexibly supporting the head arm 124 so that the head arm 124 extends approximately in the disc radial direction X.

The head carriage device further comprises an applying force means 128 provided between the second end 122s of the carriage 122 and the second end 124s of the head arm 124, to apply a force on the respective second ends 122s and 124s of the carriage 122 and head arm 124, a direction of the force being such as to keep the hear arm 124 apart from the carriage 122.

By the above construction, even though the applying force means 128 is provided between the second end 122s of the carriage 122 and the second end 124s of the head arm 124, the second end 122s of the carriage 122 substantially supporting the head arm 124, the applying force means 128 applies a force on the respective second ends 122s and 124s of the carriage 122 and head arm 124, the force effecting the first end 124f of the head arm 124 so that the second magnetic head 126 provided on the first end 124f of the head arm 124 presses the first magnetic head 125 provided on the first end 122f of the carriage 122.

Thus, a space required for containing the applying force means 128 may be reduced so as to realize miniaturization of a disc apparatus which the head carriage device is applied.

Further, in the head carriage device according to the embodiment of the present invention, a recording-medium disc to be loaded in the head carriage device comprises a magnetic disc.

Further, in the head carriage device, the applying force means 128 comprises a coil spring 128, a first end of which spring 128 presses said second end 122s of said carriage 122 and a second end of which spring 128 presses said second end 124s of said head arm 124.

Further, in the head carriage device, the pillar portions 129b and 129b of the carriage 122 have therein a containing space 129c for containing said applying force means (coil spring) 128.

Further, the supporting member comprises a leaf spring.

A construction of a magnetic disc apparatus 11 to which the head carriage device 21 according to the embodiment of the present invention is applied will now be described with reference to FIG. 5. A holder 15 is provided in the magnetic disc apparatus 11, the holder 15 being provided on a frame 12, and a disc containing case 14 (shown by a chain line in FIG. 5) being inserted in the holder 15 so that a magnetic disc 13 contained in the disc containing case 14 is loaded in the disc apparatus 11.

In the above construction of the disc apparatus 11 the holder 15 will move up in response to the loading of the disc containing case 14 in the disc apparatus or down in response to the ejecting of the case 14 from the disc apparatus. The holder 15 comprises a top plate 15a having a opening 15b through which the head carriage device can be inserted into the holder 15. A shutter lever 16 is supported to the top plate 15a so that the shutter lever 16 is pivotable in positions, such as the position thereof shown by a solid line and the other position thereof shown by a chain line. The shutter lever 16 is used for opening shutters (not shown in FIG. 5) provided on the disc containing case 14, the opening of the shutters being carried out in response to an action in that the disc containing case 14 being inserted into the holder 15. The shutters are used for protecting the magnetic disc 13 contained in the disc containing case 14. Further, the magnetic disc 13 is accessed by magnetic heads of the disc apparatus 11 through openings made when the shutters are opened.

Figure 5:
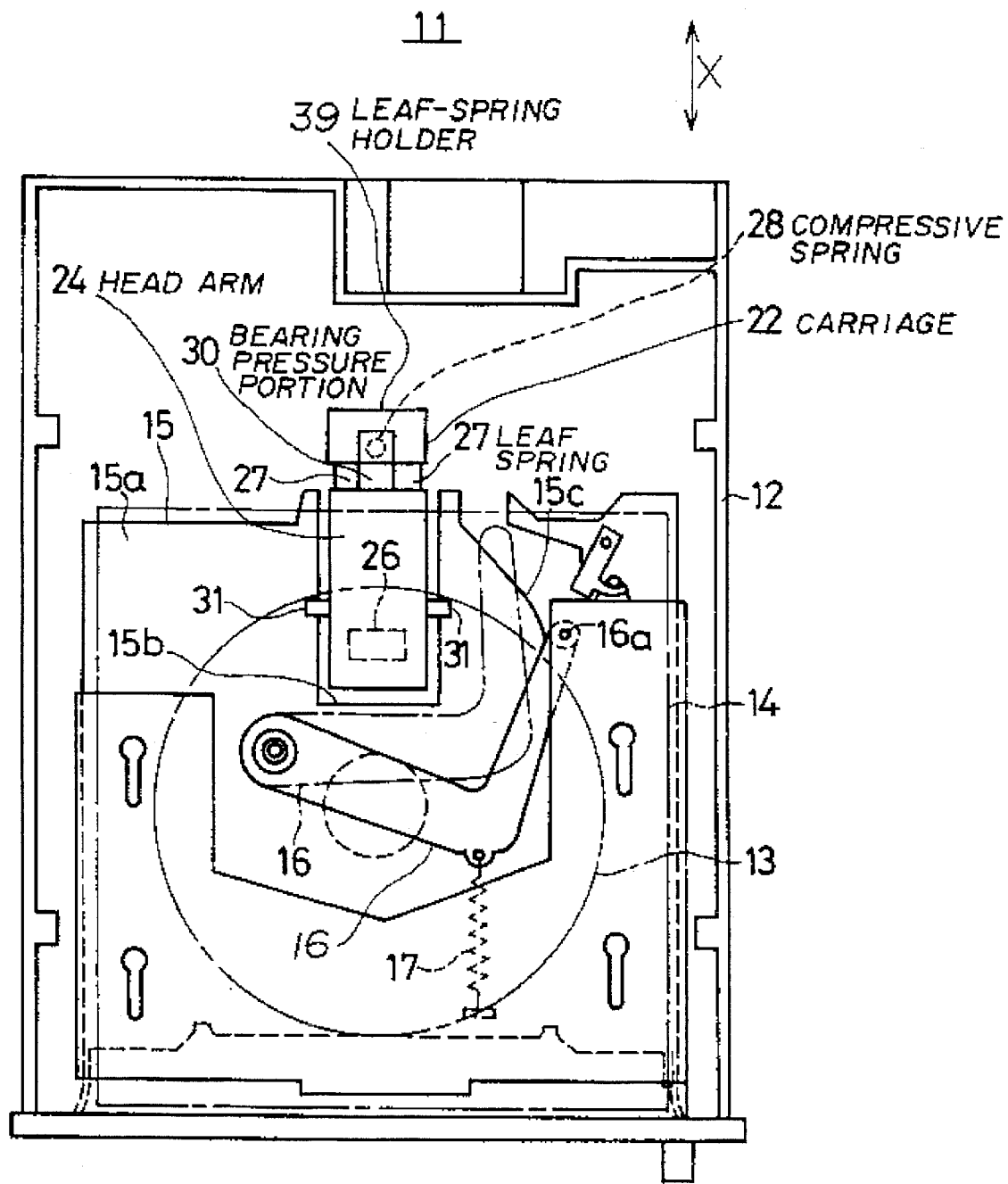
FIG. 5 shows a plan view of a magnetic disc apparatus having the a head carriage device according to the embodiment of the present invention.

The shutter lever 16 is pulled by a coil spring 17 in a clockwise direction in FIG. 5, the shutters being closed when the shutter lever 16 is pivoted in the clockwise direction (thus the lever 16 is at the position thereof shown by the solid line). An engaging pin 16a is provided on the shutter lever 16 and near the end thereof, the engaging pin 16a protruding into the inside of the holder 15 through an opening 15c provided on the holder 15. The engaging pin 16a is used for engaging the shutters so as to open the shutters by engaging and pushing them, these engaging and pushing being executed while the shutter lever 16 is pivoting in the counter-clockwise direction (then the lever 16 is finally located at the position thereof shown in the chain line).

Figure 6:
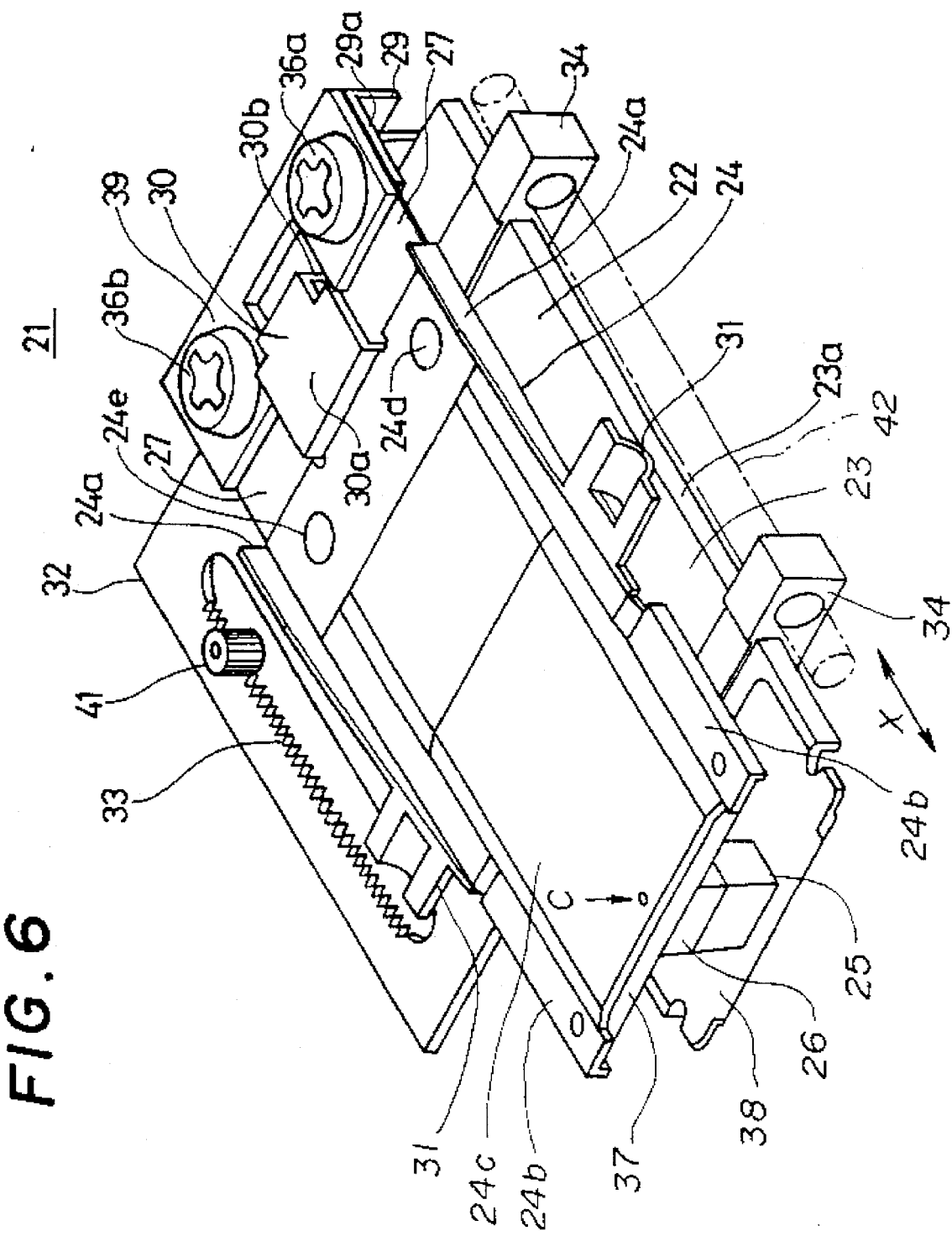
FIG. 6 shows a perspective illustration of the head carriage device according to the embodiment of the present invention.
Figure 7:
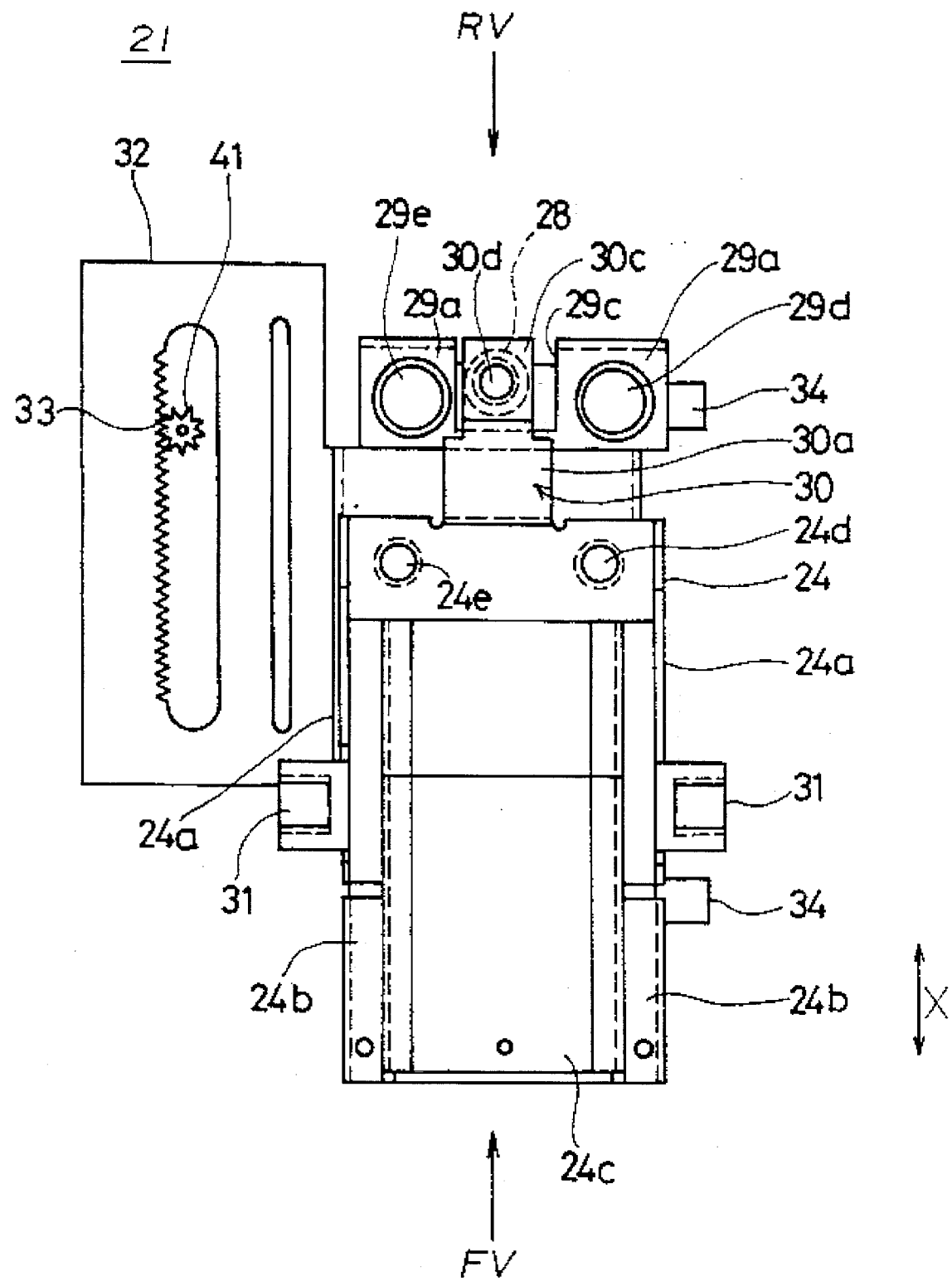
FIG. 7 shows a plan view of the head carriage device of FIG. 6.
Figure 14:
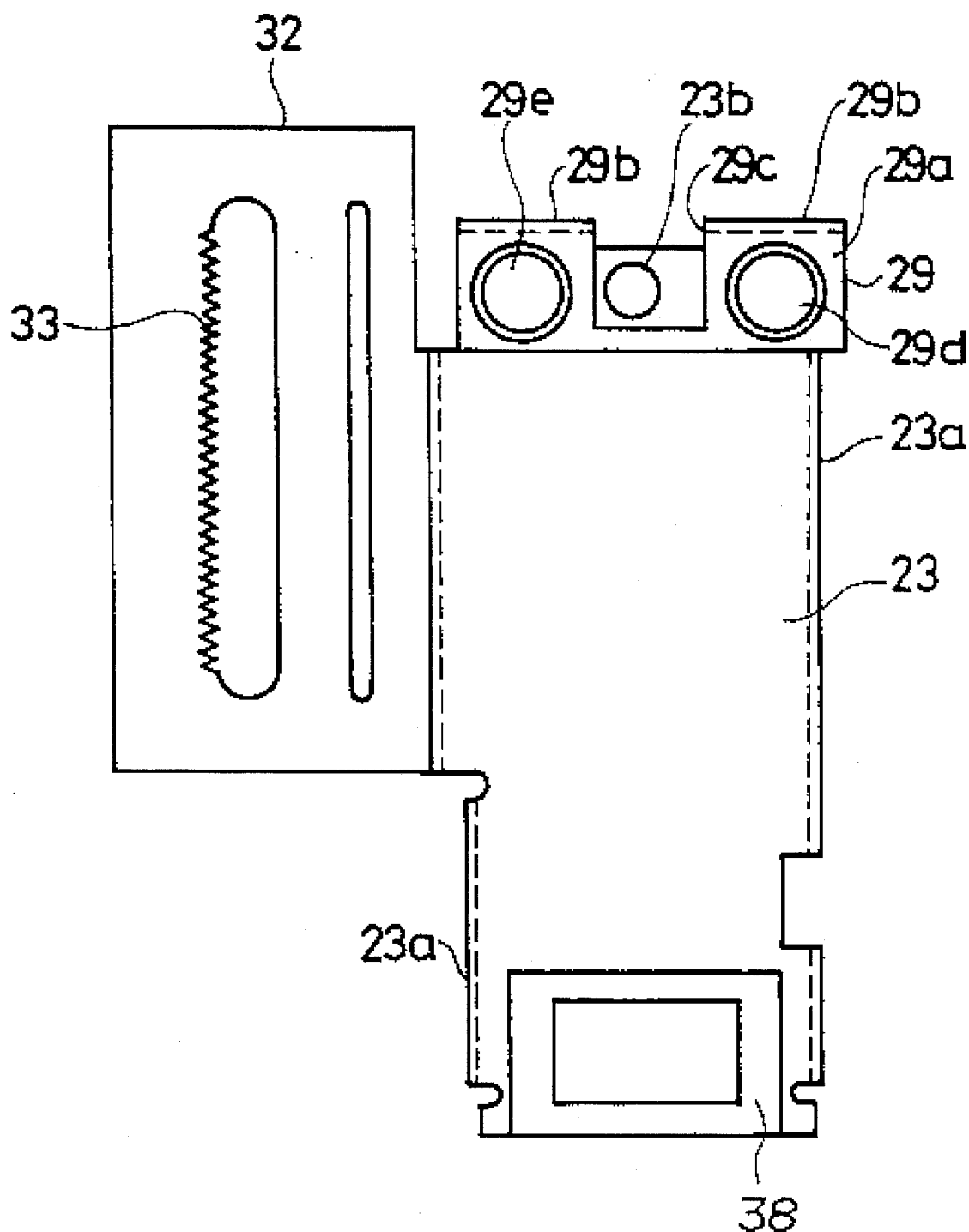
FIG. 14 shows a plan view of a carriage of the head carriage device of FIG. 6.

As shown in FIGS. 5 and 6, the head carriage device 21 comprises a carriage 22, which carriage 22 is provided on the disc apparatus 11 so that the carriage 22 may move along a disc radial direction, which direction comprises a radial direction of the magnetic disc 13 when the magnetic disc 13 is loaded in the disc apparatus 11. The carriage 22 comprises a fixing arm 23 (as shown in FIG. 14), a lower magnetic head (a first magnetic head) 25 being provided on the fixing arm 23 and near the end thereof. The carriage device 21 further comprises a head arm 24, the head arm 24 being supported on a fixing arm portion (pillar portion) 29 via a leaf spring (supporting member) 27, and the carriage 22 further comprising the fixing arm portion 29 located on a side of the head carriage device 21 opposite to a side thereof on which the lower magnetic head 25 is fixed, as shown in FIG. 14. An upper magnetic head (second magnetic head) 26 is provided on a bottom (in FIG. 6) surface of the head arm 24 and near the end thereof.

As shown in FIGS. 6 and 14, the carriage 22 comprises a rack portion 32 having a rack 33, the rack portion being located on a side of the carriage 22. The rack 33 engages a pinion 41 which is fixed on a rotating shaft of a stepping motor (the shaft and the motor are not shown in FIG. 6), the pinion 41 being driven by the stepping motor. The carriage 22 moves in correspondence with the rotation of the pinion 41, the movement of the carriage 22 being in the direction X in FIG. 6 above the frame 12, and the movement of the carriage 22 thus causing both magnetic heads 25 and 26 to move in a track direction of the magnetic disc 13. Further, guide shaft passing arms 34 and 34 are fixed on the carriage 22, through which arms 34 and 34 a guide shaft 42 passes, the guide shaft guiding the movement of the carriage 22. The guide shaft 42 is fixed on the frame 12 and the carriage 22 is supported by the guide shaft 42 so that the carriage 22 may move in the direction X along the guide shaft 42.

A bearing pressure portion 30 on the right side (in FIG. 8) of the head arm 24 is pressed by a compressive spring (applying force means) 28, the pressure being applied upward (in FIG. 8) on the bearing pressure portion 30 by means of elastic energy of the compressive spring 28. The bearing pressure portion 30 comprises the right side (in FIG. 8) portion of the head arm 24, the left side portion of the head arm 24 in FIGS. 12 and 13 (showing the sectional view of FIG. 12), and the top side portion of the head arm in FIG. 11, such differences being due to the different direction from which the head arm 24 is viewed. The elastic force applied to the bearing pressure portion 30 of the head arm 24 causes the upper magnetic head 26 to press in a direction C (in FIG. 6) the lower magnetic head 25 via the magnetic disc 13 (not shown in FIG. 6). The magnetic head 26 is pressed in the direction C because the pressing force applied by the compressive spring 28 on the bearing pressure portion 30 of the head arm 24 applies a moment in a counter-clockwise direction to the head arm. The counter-clockwise direction moment applied to the head arm 24 causes the pressing force of the magnetic head 26 to be pressed in the direction C.

The bearing pressure portion 30 comprises a horizontal portion 30a, a vertical portion 30b and an end portion 30c. The horizontal portion 30a is positioned at the back side (left side in FIGS. 12 and 13) of the bearing pressure portion 30, the vertical portion 30b is so positioned that it extends downward (in FIGS. 12 and 13) from the back end of the horizontal portion 30a, and the end portion 30c is so positioned that it extends backward from the bottom end of the vertical portion 30b. Consequently, the bearing pressure portion 30 has a shape like a crank. The leaf spring supports an intermediate portion of the head arm and the elasticity of the leaf spring allows the leaf spring to bend so that the head arm performs a seesaw movement. Thus, the leaf spring provides a fulcrum for the seesaw movement of the head arm.

Figure 11:
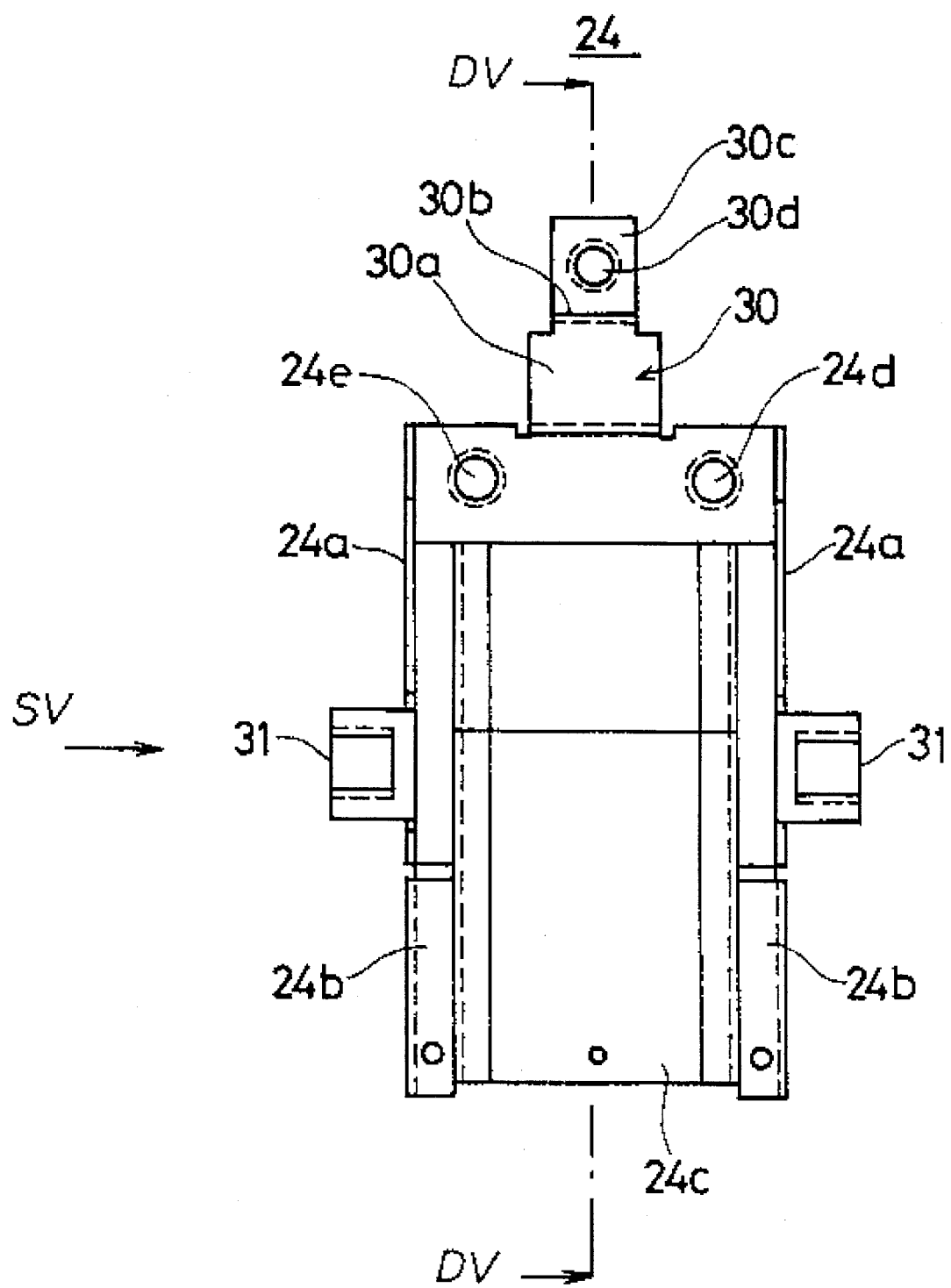
FIG. 11 shows a plan view of a head arm of the head carriage device of FIG. 6.

The head arm 24 further comprises engaging portions 31 and 31 at both sides thereof as shown in FIG. 11. In the disc apparatus 11, the respective bottoms (in FIG. 8) of the engaging portions 31 and 31 are in contact with the top surface of the top plate 15a of the holder 15 as shown in FIG. 5. By this engagement of the engaging portions 31 and 31 with the top plate 15a, before the disc containing case 14 is inserted into the holder 15, the head arm 24 is pressed upward (in FIG. 8) by raising the holder 15 so that the upper magnetic head 26 is moved apart from the lower magnetic head 25.

A construction of the head carriage device 21 will now be detailed with reference to FIGS. 7, 8, 9, 10 and 14. FIGS. 5, 7, 8, 9 and 10 show the construction of the head carriage 21, screws 36a and 36b (shown in FIG. 6) for use in fixing the leaf-spring holder 39 not being shown in these FIGS.

Both the carriage 22 and head arm 24 are made by sheet metal plates being pressed. The fixing arm 23 has edge portions 23a and 23a at both sides thereof as shown in FIG. 14, the edge portions 23a and 23a being made by bending downward (in FIG. 8) both-side ends of the fixing arm 23. The edge portions 23a and 23a increase the strength of the fixing arm 23. A gimbal plate 38 is fixed on the front side (left side in FIG. 8) of the fixing arm 23 as shown in FIG. 6, the lower magnetic head 26 being mounted on the gimbal plate 38.

The fixing arm portion 29 is formed at the back-side (top side in FIG. 14) end of the carriage 22. The fixing arm portion 29 comprises pillar plates 29b and 29b and a top plate 29a. The pillar plates 29b and 29b are so positioned that they extend upward (in FIG. 8) from the back-side(right side in FIG. 8) end of the fixing arm portion 29, and the top plate 29a is so positioned that it extends forward (leftward in FIG. 8) from the top end of the pillar plates 29b and 29b parallel to the direction along which the fixing arm 23 extends. An opening portion 29c is formed on the fixing arm portion 29, the opening portion 29c being located between the pillar portions 29b and 29b and the opening portion 29c being used as a space for containing both the back-side (right side in FIG. 8) end of the above compressive spring 28 and the back-side end of the bearing pressure portion 30 of the head arm 24.

Figure 8:
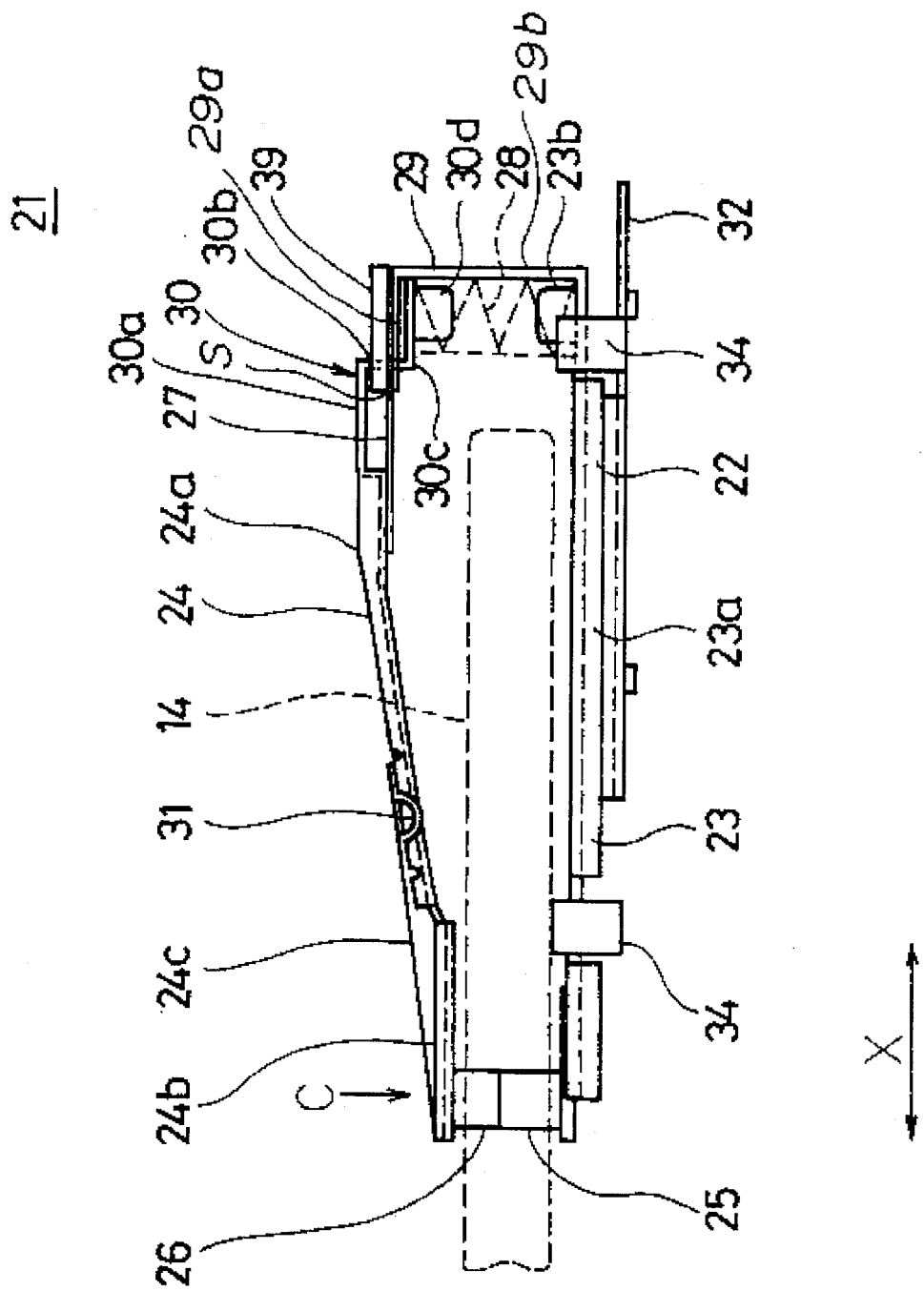
FIG. 8 shows a side view of the head carriage device of FIG. 6.
Figure 9:
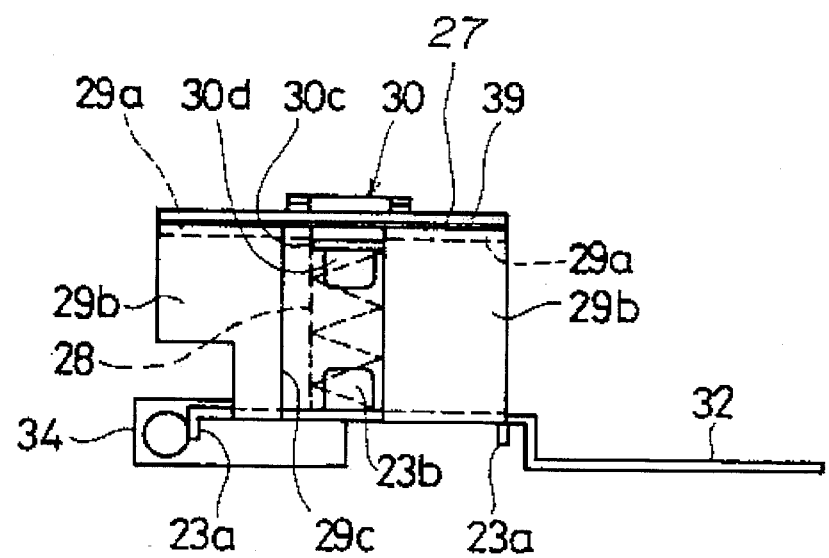
FIG. 9 shows a rear view of the head carriage device of FIG. 6 viewed from a direction RV in FIG. 7.
Figure 10:
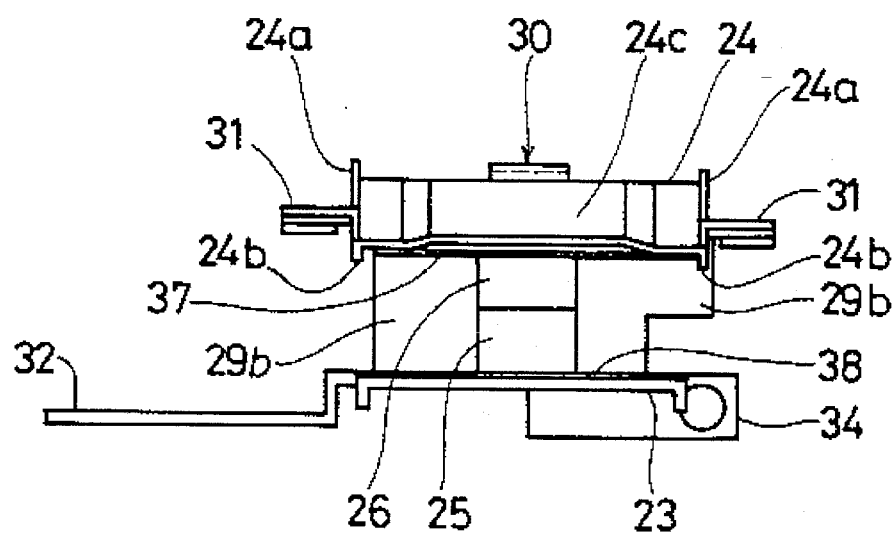
FIG. 10 shows a front view of the head carriage device of FIG. 6 viewed from a direction FV of FIG. 7.

Screw holes 29d and 29e are provided in the top plate 29a of the fixing arm portion 29, the screws 36a and 36b respectively passing through the screw holes 29d and 29e so that the leaf spring 27 is fixed on the top plate 29a. A protrusion portion 23b is formed on the back-side (right side in FIG. 8) end of the fixing arm 23 as shown in FIG. 8, the protrusion portion 23b fitting into the compressive spring 28.

The rack portion 32 is integrally provided at the left side of the fixing arm 23 as shown in FIG. 14, the rack portion having the rack 33. The guide shaft passing arms 34 and 34 are provided respectively at a forward position and a backward position on the right side of the fixing arm 23 as shown in FIG. 6, the guide shaft 42 fitting into the holes of the shaft passing arms 34 and 34 so that the shaft passing arms 34 and 34 can slide on the guide shaft 42.

The construction of the head arm 24 will now be described in detail with reference to FIGS. 11, 12 and 13. Edge portions 24a and 24a are formed at both sides of the head arm 24 as shown in FIG. 11, the edge portions 24a and 24a being made by bending upward (in FIGS. 12 and 13) both-side ends of the fixing arm 23. The edge portions 24a and 24a increase the strength of the head arm 24. The contacting portions 31 and 31 protrude sideways from both sides of the head arm as shown in FIG. 11. The contacting portions 31 and 31 comprise portions having semicircular-shaped sections, the respective protruding sides of the semicircular shapes facing downward as shown in FIG. 12.

Mounting gimbal portions 24b and 24b are formed at both sides of the front side (right side in FIGS. 12 and 13) of the head arm 24 as shown in FIG. 11. The disc apparatus 11 and head carriage device 21 are constructed so that the respective bottom (in FIGS. 12 and 13) surfaces of the mounting gimbal portions 24b and 24b are approximately parallel to the top surface of the disc containing case 14 when both of the magnetic heads 25 and 26 slide on the disc 13. A gimbal plate 37 is fixed on the bottom surfaces of the mounting gimbal portions 24b and 24b as shown in FIG. 6, the upper magnetic head 26 being mounted on the gimbal plate 37.

Figure 12:
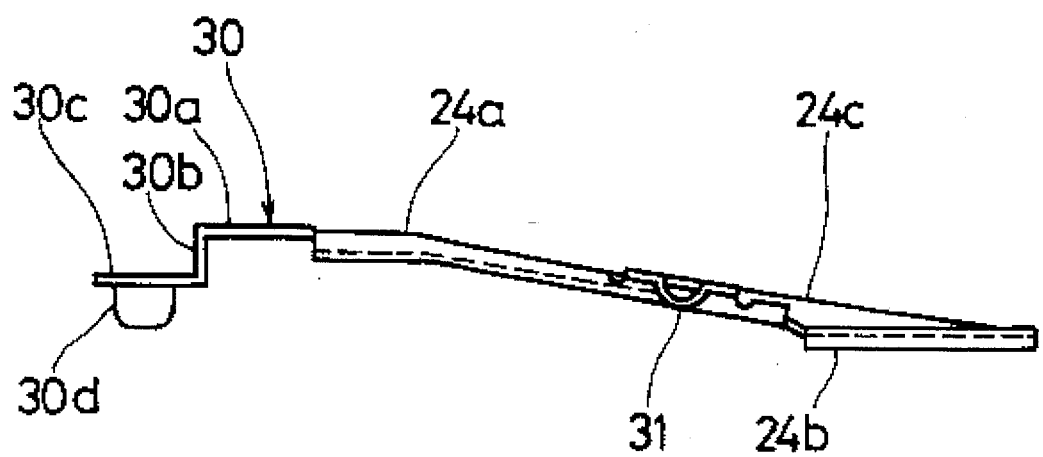
FIG. 12 shows a side view of the head arm viewed from a direction SV of FIG. 11.
Figure 13:
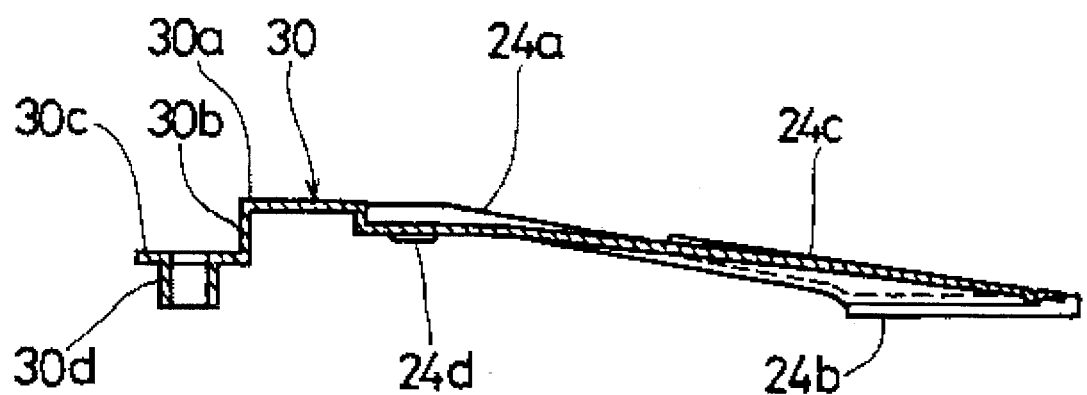
FIG. 13 shows a sectional view of the head arm taken along a line DV—DV of FIG. 11.

The head arm 24 comprises a top plate 24c, the top plate 24c being formed so that the front side (right side) of the top plate 24c declines downward as shown in FIGS. 12 and 13. The head arm 24 further comprises tapered portions at the front (right side in FIGS. 12 and 13) of both sides (right and left sides in FIG. 11) thereof as shown in FIGS. 12 and 13. Further, the head arm 24 comprises the bearing pressure portion 30 at the back (left in FIGS. 12 and 13) side of the head arm 24, the bearing pressure portion 30 extending from the back end of the top plate 24c as shown in FIGS. 11, 12 and 13. A protrusion 30d protrudes downward from the center of the end portion 30c as shown in FIGS. 12 and 13, the protrusion 30d having a shape like a cylinder and the protrusion 30d for fitting into the top part of the compressive spring 28 as shown in FIG. 8. Further, fixing leaf-spring protrusions 24d and 24e protrude downward from the back part of the top plate 24c as shown in FIGS. 11 and 13, the fixing leaf-spring protrusions 24d and 24e being used for fixing the leaf spring 27.

Figure 15:
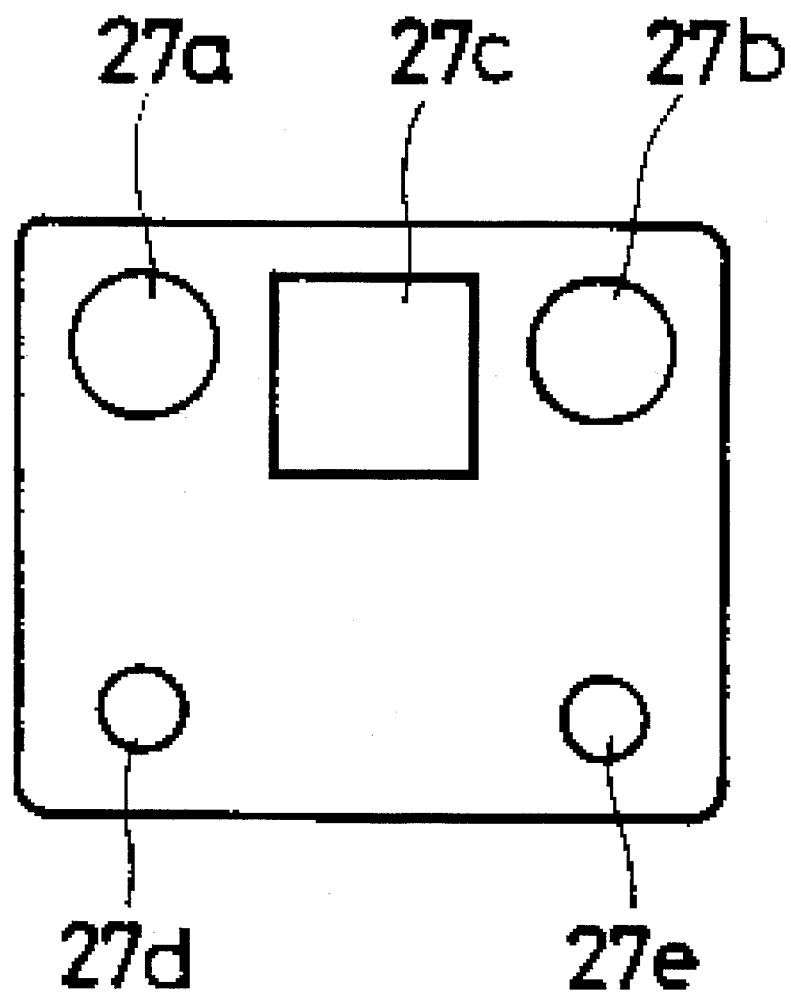
FIG. 15 shows a plan view of a leaf spring of the head carriage device of FIG. 6.

A construction of the leaf spring 27 will now be described with reference to FIG. 15. The leaf spring 27 having a shape like a square as shown in FIG. 15 has holes 27d and 27e for fixing the leaf spring 27 to the head arm 24 and holes 27a and 27b for fixing the leaf spring 27 on the top plate 29a of the fixing arm portion 29 by means of the screws 36a and 36b. Further, a hole 27c having a shape like a square is formed at an intermediate position between the holes 27a and 27b, the bearing pressure portion 30 of the head arm 24 passing the hole 27c.

The leaf spring 27 is fixed to the bottom surface of the head arm 24 as shown in FIG. 8 by crushing the fixing leaf-spring protrusions 24d and 24e after they are fitted into the holes 27d and 27e, respectively. The leaf spring 27 is fixed on the fixing arm portion 29 by means of the screws 36a and 36b via the leaf-spring holder 39 after the holes 27a and 27b have been aligned with the screw holes 29d and 29e, respectively.

Further, the protrusion 23b of the fixing arm 23 is fitted into the bottom part of the compressive spring 28, and the protrusion 30d of the bearing pressure portion 30 is fitted into the top part of the compressive spring 28. Such constructions prevents removal of the compressive spring 28 from the fixing arm portion 29 and from the bearing pressure portion 30 even when the head arm 24 rotates. The head arm 24 rotates with respect to a rotational axis located along a line S or the front (left in FIG. 8) end of the top plate 29a of the fixing arm portion 29, the leaf spring 27 being fixed to the top plate 29a. The force applied by means of the compressive spring 28 is thus stabilized, the force being applied on the head arm 24 so as to cause the head arm 24 to rotate such that the upper magnetic head 26 is pressed downward in the direction C in FIG. 8.

The compressive spring 28 has a function for pressing upward in FIG. 8 the bearing pressure portion 30 of the head arm 24, the compressive spring 28 being located underneath the top plate 29a of the fixing arm portion 29, which top plate is used for fixing the leaf spring 27 thereto. The bearing pressure portion 30 having a shape like a crank, may thus be constructed so as to extend, via the opening portion 29c of the fixing arm portion 29, to underneath the top plate 29a of the fixing arm portion 29, the protrusion 30d thus fitting into the top part of the compressive spring 28.

A difference, with respect to the vertical direction in FIG. 8, between the level of the horizontal portion 30a of the bearing pressure portion 30 and the level of the top plate 24c of the head arm 24c is relatively small. Such construction as mentioned above greatly reduces the extra space needed for containing the compressive coil spring 28. Thus, reduction of the overall dimensions of the head carriage device 21, particularly reduction of its height and length (in FIG. 8), may be realized.

Operations of the head carriage device 21 will now be described. Before the disc containing case 14 is inserted in to the holder 15, the holder 15 is raised in FIG. 8. As a result of raising the holder 15, the head arm 24 is lifted due to the holder 15 pressing the contacting portions 31 and 31 and the raising of the head arm 24 results in the magnetic heads 26 being moved apart from the magnetic head 25.

Insertion of the disc containing case 14 into the holder 15 causes, by means of a raising/lowering mechanism (not shown in the drawings), the holder 15 to be lowered (in FIG.

8), the head arm 24 then rotating in a counter-clockwise direction in FIG. 8 with respect to the above rotational axis, thus causing the end (left end in FIG. 8) of the head arm 24 to move downward. The head arm 24 rotates because the compressive coil spring 28 applies an elastic pressing force on the bearing pressure portion 30 to lift it, the elastic pressing force causing the rotation of the head arm 24 because the lowering of the holder 15 causes the head arm 24 to be released from being lifted by the holder 15 via the contacting portions 31 and 31. The rotation of the head arm 24 results in the upper magnetic head 26 being lowered. The shutters (not shown in the drawings) of the disc containing case 14 are opened while the disc containing case 14 is being inserted into the holder 15, the shutters being used for protecting the disc 13. It is necessary to open the shutters so that the magnetic heads 25 and 26 can access the disc 13 via the opening made by the opening of the shutters. Thus, the magnetic heads 25 and 26 come in contact with both sides of the disc 13 as a result of the disc containing case 14 being inserted into the holder 15.

Then, a motor (not shown in the drawings) rotates the disc 13 so that the magnetic heads 25 and 26 access the disc 13 to write data in the disc 13 or reading data from the disc 13.

When both of the heads 25 and 26 are in contact with the disc 13, the heads 25 and 26 apply head loading pressures on the respective surfaces of the disc 13. The head loading pressures are generated as a result of the head 26 being loaded in the direction C (in FIG. 8) by the elastic pressing force of the compressive coil spring 28. This loading on the head 26 is caused by the moment of the rotation of the head arm 24 in the counter-clockwise direction (in FIG. 8) with respect to the above rotational axis, the moment causing the end of the head arm 24 to press the upper magnetic head 26 downward (in FIG. 8) so that the top magnetic head 26 presses the top side surface of the disc 13 and thus the pressure results in counteraction of the bottom magnetic head 25 via the disc 13, by which counteraction the head 25 presses the bottom side surface of the disc 13. The moment of the rotation of the head arm 24 is caused by the compressive coil spring 28 applying an upward pressing force to the end portion 30c of the bearing pressure portion 30, the bearing pressure portion 30 comprising the back (rightward in FIG. 8) end part of the head arm 24.

The head loading pressures of the magnetic heads 25 and 26 ensure good head touching property (the heads 25 and 26 thus touch the respective surfaces of the disc 13 in appropriate pressures) so as to maintain stable write/read performance of the disc apparatus 11.

In summary, in the head carriage device according to the embodiment of the present invention, the compressive coil spring 28 for applying the moment to the head arm 24 is provided adjacent to or inside of the fixing arm portion 29 provided at the back (right in FIG. 8) end of the carriage 22. Thus, miniaturization of the disc apparatus 11 is facilitated as a result of the overall dimensions of the disc apparatus being reduced, particularly the height and length (in FIG. 8) of the head carriage device 21.

The embodiment according to the present invention is not limited to using such a compressive coil spring to apply a moment to the head arm. For example, a tension coil spring instead of the compressive coil spring may be used, such spring being provided adjacent to or inside of the fixing arm portion. Further, instead of the carriage 22 and head arm 24 being made by pressing sheet metal plates, the carriage 22 and head arm 24 may be made from synthetic resin, such a carriage and head arm being used in another embodiment according to the present invention.

Furthermore, instead of the construction by which the bearing pressure portion 30 extends from the back (right in FIG. 8) end of the head arm 24, by another construction in another embodiment of the present invention the bearing pressure portion 30 is constructed so as to extend from another part of the head arm 24 up to the position at which the compression coil spring applies upward pressure to the bearing pressure portion, the above other part of the head arm 24 comprising a part around the end (left end in FIG. 8) thereof or an intermediate part thereof.

Advantages of the present invention will now be described. A space is used for containing the applying force means (the compressive coil spring 27 in the above embodiment acting as the applying force means), the space being adjacent to or inside of the fixing arm portion acting as a pillar portion. The (in this invention) space has not been used in the related art. This results in the reduction of the overall dimensions of the head carriage device, particularly the height and length thereof, and accordingly a disc apparatus to which the head carriage device is applied can be miniaturized, such miniaturization including the reduction of the thickness thereof.

The present invention is not limited to the above described embodiments, and variations and modifications may be made without departing from the scope of the present invention.

What is claimed is:

1. A head carriage device comprising:

a carriage having a first head at a first end thereof, said carriage extending approximately in a disc radial direction in which a recording-medium disc is located in an associated disc apparatus, and said carriage having pillar portions at a second end thereof, said pillar portions extending in a direction approximately perpendicular to said disc radial direction;

a head arm having a second head at a first end thereof, both said first head and said second head being used for jointly accessing both sides of the recording-medium disc loaded in said disc apparatus, said head arm having a second end located within a space formed between said pillar portions and an intermediate supported portion away from said second end of said head arm;

a supporting member having a mechanically flexible property, a first end thereof being fixed on a top of said pillar portions and positioned above the second end of the head arm, and a second end thereof being fixed on said supported portion of said head arm, said supporting member flexibly supporting said head arm so that said head arm extends approximately in said disc radial direction and providing a fulcrum about which said head arm is capable of performing a seesaw movement; and applying force means provided within the space between said pillar portions and between said second end of said carriage and said second end of said head arm, to apply a force on said respective second ends of said carriage and head arm, a direction of said force being such as to move said second end of said head arm apart from said second end of said carriage, thereby causing the first and second heads to close toward each other.

2. The head carriage device according to claim 1, wherein said recording-medium disc to be loaded in said disc apparatus comprises a magnetic disc.

3. The head carriage device according to claim 1, wherein said applying force means comprises a coil spring, a first end of which spring presses said second end of said carriage and a second end of which spring presses said second end of said head arm.

4. The head carriage device according to claim 1, wherein said space between the pillar portions of said carriage is sufficient to allow said second end of said head arm to move therein.

5. The head carriage device according to claim 1, wherein said pillar portions comprise a plurality of pillars and at least a part of said applying force means is located in said space formed between said plurality of pillars.

6. The head carriage device according to claim 1, wherein said pillar portions comprise a plurality of pillars and said second end of said head arm is located in said space formed between said plurality of pillars.

7. The head carriage device according to claim 6, wherein said applying force means comprises a coil spring which is located between said plurality of pillars.

8. The head carriage device according to claim 7, wherein said plurality of pillars comprise two pillars; said second end of said head arm and said coil spring lie on a straight line that connects said two pillars.

9. The head carriage device according to claim 7, wherein said supporting member comprises a leaf spring.

10. The head carriage device according to claim 1, wherein said supporting member comprises a leaf spring.

11. The head carriage device according to claim 1, wherein a distance between said first and second ends of said head arm is longer than a distance between said first end of said head arm and said supported portion of said head arm.

12. The head carriage device according to claim 1, wherein said head arm comprises a body portion, a first end of said body portion corresponding to the first end of said head arm, said head arm further comprising a tail portion extending in said disc radial direction from a second end of said body portion, said second end of said body portion corresponding to said supported portion of said head arm, said pillar portions comprise two pillars with said space formed between said two pillars, a free end of said tail portion corresponding to said second end of the head arm and being inserted into said space formed between said two pillars so that said free end of said tail portion is aligned with ends of said two pillars, said free end of said tail portion being the farthest end of said tail portion from said body portion.

13. The head carriage device according to claim 1, wherein said first end of said supporting member fixed on said top of said pillar portions is in a position which is at a distance away from a disc rotational axis of said disc apparatus about which the recording-medium disc is rotated after said recording-medium disc is loaded in said disc apparatus; and said second end of said head arm, on which said applying force means applies said force, is in a position which is at the same distance from said disc rotational axis as the first end of said supporting member.

14. The head carriage device according to claim 1, wherein said supported portion of said head arm is further away from the top of said pillar portions than said fulcrum.

15. A head carriage device comprising:

a carriage having a first head at a first end thereof, said carriage extending approximately in a disc radial direction in which a recording-medium disc is located in an associated disc apparatus, and said carriage having a member including pillar portions at a second end thereof, said pillar portions extending in a direction approximately perpendicular to said disc radial direction;

a head arm having a second head at a first end thereof, both said first head and said second head being used for jointly accessing both sides of the recording-medium disc located in said disc apparatus, said head arm having a second end located within a space formed between said pillar portions and an intermediate supported portion away from said second end of said head arm;

a supporting member having a mechanically flexible property, a first end thereof being fixed on a top of said pillar portions and positioned above the second end of the head arm, and a second end thereof being fixed on said supported portion of said head arm, said supporting member flexibly supporting said head arm so that said head arm extends approximately in said disc radial direction and providing a fulcrum about which said head arm is capable of performing a seesaw movement; and applying force means provided within the space between said pillar portions and between said second end of said carriage and said second end of said head arm, to apply a force on said respective second ends of said carriage and head arm, a direction of said force being such as to move said second end of said head arm apart from said second end of said carriage, thereby causing the first and second heads to close toward each other.

16. A head carriage device comprising:

a carriage having a first head at a first end thereof, said carriage extending approximately in a disc radial direction in which a recording-medium disc is located in an associated disc apparatus, and said carriage having a member including pillars at a second end thereof, said pillars extending in a direction approximately perpendicular to said disc radial direction;

a head arm having a second head at a first end thereof, both said first head and said second head being used for jointly accessing both sides of the recording-medium disc loaded in said disc apparatus, said head arm having a second end located within a space formed between said pillars and an intermediate supported portion away from said second end of said head arm;

a supporting member having a mechanically flexible property, a first end thereof being fixed on a top of said pillars and positioned above the second end of the head arm, and a second end thereof being fixed on said supported portion of said head arm, said supporting member flexibly supporting said head arm so that said head arm extends approximately in said disc radial direction and providing a fulcrum about which said head arm is capable of performing a seesaw movement; and applying force means provided within the space between said pillars and between said second end of said carriage and said second end of said head arm, to apply a force on said respective second ends of said carriage and head arm, a direction of said force being such as to move said second end of said head arm apart from said second end of said carriage, thereby causing the first and second heads to close toward each other.

* * * * *